United States Patent [19]
De Koker et al.

[11] 3,876,960
[45] Apr. 8, 1975

[54] SHOCKED PLATE METAL ATOM OXIDATION LASER

[75] Inventors: Jon G. De Koker, Jemez Springs; Walter W. Rice, Jr.; Reed J. Jensen, both of Los Alamos, all of N. Mex.

[73] Assignee: The United States of America as represented by the United States Atomic Energy Commission, Washington, D.C.

[22] Filed: May 9, 1974

[21] Appl. No.: 468,314

[52] U.S. Cl. ........ 331/94.5 P; 330/4.3; 331/94.5 G; 102/24 HC
[51] Int. Cl. .......................... H01s 3/09; H01s 3/22
[58] Field of Search .................... 331/94.5; 330/4.3; 102/24 HC

[56] References Cited
UNITED STATES PATENTS
2,892,407 6/1959 Macleod ...................... 102/24 HC
3,829,793 8/1974 Jensen et al. ................... 331/94.5 P

OTHER PUBLICATIONS

Munroe, Newport Natural History Society Proceedings, 1883–1888, 1–6, From Report No. 6. pp 18–24.

*Primary Examiner*—Robert J. Webster
*Attorney, Agent, or Firm*—John A. Horan; Edward C. Walterscheid

[57] ABSTRACT

A method and apparatus for producing metal atom oxidation lasing wherein an explosively shocked grooved metal plate produces metal vapor jets directed through an appropriate gaseous oxidizer. Reaction of the metal vapor with the oxidizer produces molecular species having a population inversion therein.

7 Claims, 4 Drawing Figures

SHOCKED PLATE METAL ATOM OXIDATION LASER

BACKGROUND OF THE INVENTION

The invention described herein was made in the course of, or under, a contract with the U.S. Atomic Energy Commission. It relates to chemical lasers and more particularly to a chemical laser in which atoms of metal react with a gaseous oxidizer to produce a lasing species.

In U.S. Pat. application Ser. No. 304,578, filed Nov. 7, 1972 now U.S. Pat. No. 3,829,793, two of the present inventors, Rice and Jensen, along with their coinventor, disclose a new type of chemical laser termed a "metal atom oxidation laser." Through production of copious quantities of metal or carbon atoms in a reaction vessel containing a gaseous oxidizer and placed within an optical resonant cavity, chemical lasing is readily achieved. The lasing species are molecular in nature and are readily produced by exchange or other abstraction reactions between the metal or carbon atoms and the oxidizer. The molecular species may be metal or carbon halides or oxides. Metals and oxidizers which form lasing molecular species are limited only by the requirements that (1) the particular reaction forming the species be exothermic, and (2) the exothermicity be deposited in the molecular species sufficiently and with a distribution to produce a population inversion in the vibrational levels leading to optical gain in the system.

According to U.S. Pat. No. 3,829,793, various metals may be atomized within the reaction vessel by any of the following techniques: (a) exploding wire, (b) imploding film, (c) explosively driven jets, (d) rapid decomposition of gaseous organometallics and/or metal azides, and (e) laser evaporation. It is suggested that appropriate metal jets may be produced through detonation of a high explosive shaped charge having a hollow conical liner of the desired metal. The implosion of the liner on itself produces the desired jet of metal vapor. A difficulty with this particular geometry, however, is avoiding undue mixing of the high explosive detonation products with the oxidizer before the metal jet can appropriately react with it to produce the lasing species.

SUMMARY OF THE INVENTION

In accordance with the method and apparatus of the present invention, metal atoms are formed and reacted with an appropriate gaseous oxidizer to form molecular species containing the metal atoms and having a population inversion therein by explosively shocking a grooved metal plate to produce jets of metal vapor directed through the gaseous oxidizer. By positioning the grooved plate relative to an optical cavity at a distance whereby the plate standoff distance to the cavity diameter ratio substantially equals the plate free surface to jet velocity ratio, the metal jets are assured of substantially crossing the optical cavity by the time the plate itself enters the cavity. The reaction of the metal vapor with the oxidizer to produce inverted molecular species is thus substantially completed before solid metal or detonation products of the high explosive enter the optical cavity.

The grooves in the metal plate may be any of a variety of shapes; however, a rectangular shaped groove is preferred. The method and apparatus may be used with any metal-oxidizer combination which produces metal atom oxidation lasing. Oxidizers known to be useful for this purpose in combination with certain metals include $F_2$, $Cl_2$, $O_2$, and $NF_3$. Fluorine is particularly well suited for use as an oxidizer and is known to produce metal atom oxidation lasing with Li, C, Mg, Al, Ti, V, Fe, Ni, Cu, Zr, Zn, Mo, Ag, Ta, W, Pt, Au, Pb, and U. Indeed, no metal has as yet been found, which when atomized and mixed with $F_2$, will not produce metal atom oxidation lasing.

FORMATION OF METAL JETS

Metal jets may be readily formed by the collision of strongly shocked metal plates. The necessary shock is easily provided by the detonation of high explosives. Jets may also be formed from explosively shocked grooved metal plates when the walls of the grooves collide. The groove shape has a considerable effect on the nature and velocity of the jet produced when the plate is explosively shocked. For vee-shaped grooves, the jet velocity is a complex function of the groove angle. Indeed, there is a jetless regime for small collision angles up to a critical angle above which jets are formed. The highest jet velocities occur just above the critical angle and decrease monotonically to the plate velocity as the collision angle approaches 180°. The critical angle is a function of plate material and plate velocity. Certain of the foregoing principles are discussed in Walsh et al., J. Appl. Phys. 24, 349 (1953) for colliding plates. As indicated herein, however, they are applicable to the formation of jets from grooves as well.

Figure 1:
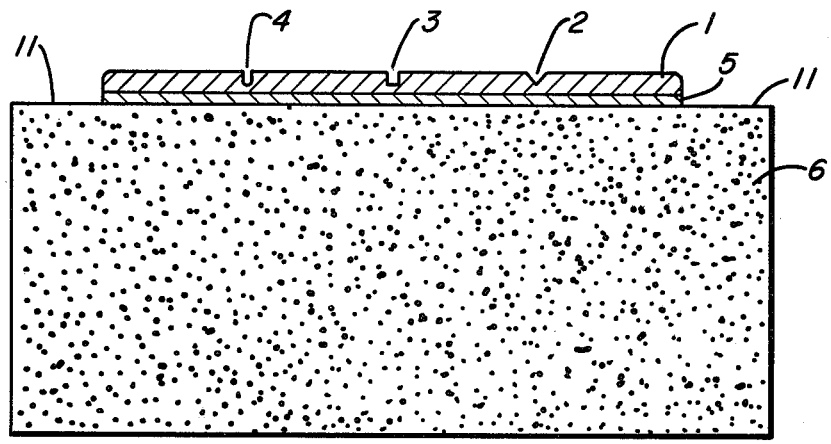
FIG. 1 is an end view of a grooved uranium plate and high explosive assembly.
Figure 2:
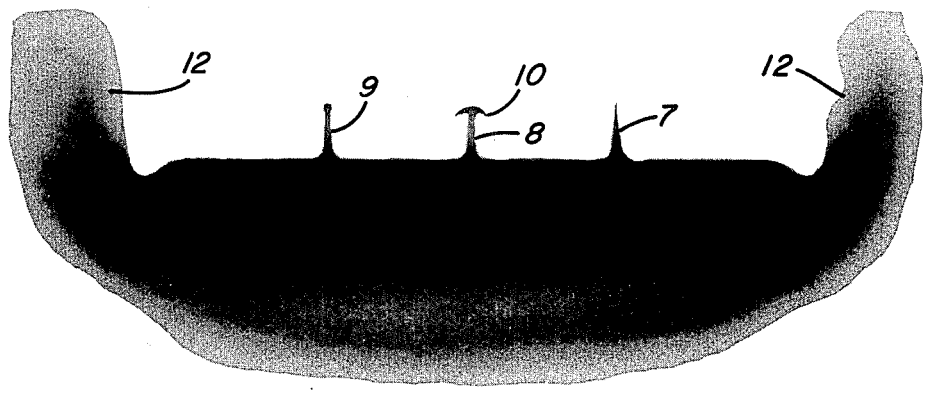
FIG. 2 is taken from a flash radiograph of the assembly of FIG. 1, 5.67 $\mu$sec after the shock wave left the free surface of the uranium.

The manner in which a grooved plate may be explosively shocked to produce metal jets is shown in FIGS. 1 and 2. In FIG. 1, uranium plate 1 is 0.5 cm thick and has in its upper surface a 0.25 cm deep vee groove 2, a 0.2 cm wide by 0.25 cm deep rectangular groove 3, and a 0.25 cm deep by 0.1 cm radius circular groove 4. Under plate 1 is a 0.3 cm thick magnesium plate 5 for impedance matching and then a 20.32 cm wide Cyclotol (75 percent RDX, 25 percent TNT) charge 6. FIG. 2 is taken from a flash radiograph 5.67 $\mu$sec after the shock wave left the free surface of the uranium. Jet 7 is from groove 2, jet 8 from groove 3 and jet 9 from groove 4. Jets 8 and 9 have about the same velocity, 3.2 mm/$\mu$sec, compared to 3.0 mm/$\mu$sec for jet 7. The "palm tree" structure of jet 8 is of special interest. The "fronds" 10 are apparently produced by the interaction of the jets coming from the corners of groove 3. They have a lateral velocity of about 0.3 mm/$\mu$sec.

Jets such as jet 8 which produce fronds 10 are advantageous for use in metal atom oxidation lasers in that they produce more metal vapor than jets such as jets 7 and 9. Further, if the rectangular grooves 3 which produce jets 8 are closely adjacent, then the collisions of adjacent fronds 10 with each other serve to enhance metal-oxidizer mixing.

It can be seen from FIG. 1 that the high explosive charge 6 extends beyond either end of plate 1. There are thus free surfaces 11 which do not act on plate 1 and are not retarded by plate 1 during the detonation. As shown in FIG. 2, the detonation products 12 from these free surfaces 11 expand more rapidly into the volume above plate 1 than do jets 7, 8, and 9. Because of this fact, it becomes apparent that it is highly undesirable for plate 1 to rupture prematurely or otherwise allow the detonation products from charge 6 to enter into the volume above plate 1 before jets such as jets 7, 8, or 9 can interact with an oxidizer in this volume. If this occurs, the formation of lasing species may be prematurely terminated or even prevented altogether. In FIG. 2, however, at 5.67 $\mu$sec after the shockwave left the free surface of the uranium plate there is no indication of plate rupture. It has been shown by flash radiography that even after 22.06 $\mu$sec, a plate such as plate 1 having grooves therein like grooves 2, 3, and 4 does not rupture. The importance of this is that the plate is still intact at times greater than the jet transit time through the optical cavity of the laser configuration described herein as the preferred embodiment.

From the foregoing, it is apparent that a significant factor in the design of a metal atom oxidation laser employing explosively driven metal jets is the plate to optical cavity standoff distance. In general, an optimum value exists which is a compromise between the vapor mixing, metal-oxidation reaction and lasing species deactivation rates on the one hand, and the jet and plate free surface velocities on the other. The latter consideration is primarily geometrical, as the plate standoff distance to cavity diameter ratio should equal the plate free surface to jet velocity ratio to permit the jets to completely cross the cavity by the time the plate itself enters the cavity. This ratio was 0.31 for the configuration described as the preferred embodiment herein.

Finally, the explosive shock required to be imparted to a grooved metal plate to produce jetting is dependent on the boiling point and heat of vaporization of the particular metal used. Thus, for example, magnesium, which has a boiling point of 1378 K and a heat of vaporization of 128 kJ/mole, produces excellent jetting and lasing action in the configuration of the preferred embodiment whereas uranium, which has a boiling point of 4407 K and a heat of vaporization of 465 kJ/mole, does not. This does not mean that suitable uranium jets cannot be produced in accordance with the invention, but merely that greater explosive shocking is required than is produced by the explosive assembly of the preferred embodiment herein disclosed.

DESCRIPTION OF THE PREFERRED EMBODIMENT

Figure 4:
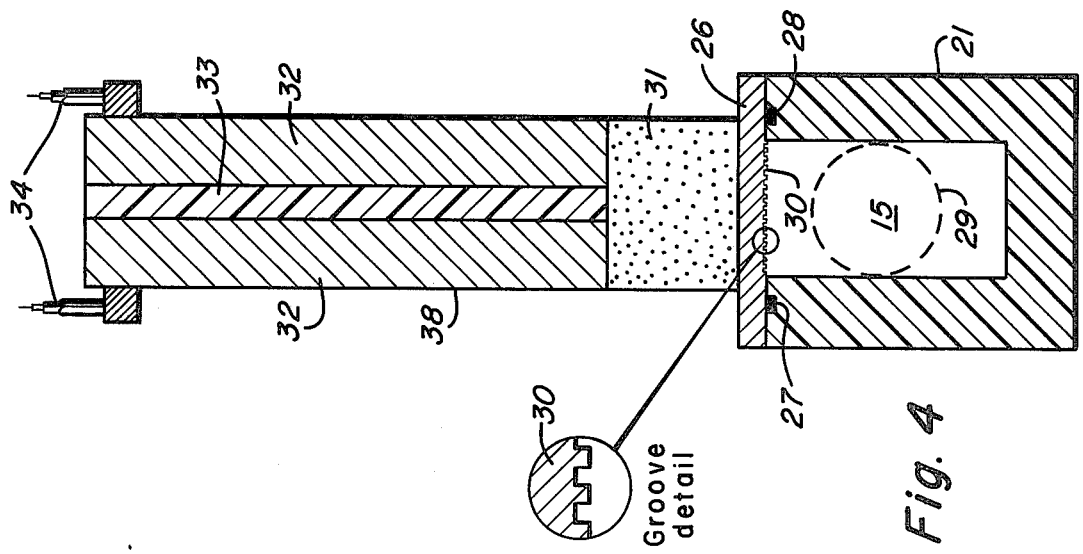
FIG. 4 is a cross-sectional schematic end view of the reaction chamber, grooved metal plate, and explosive assembly of the laser of FIG. 3.
Figure 3:
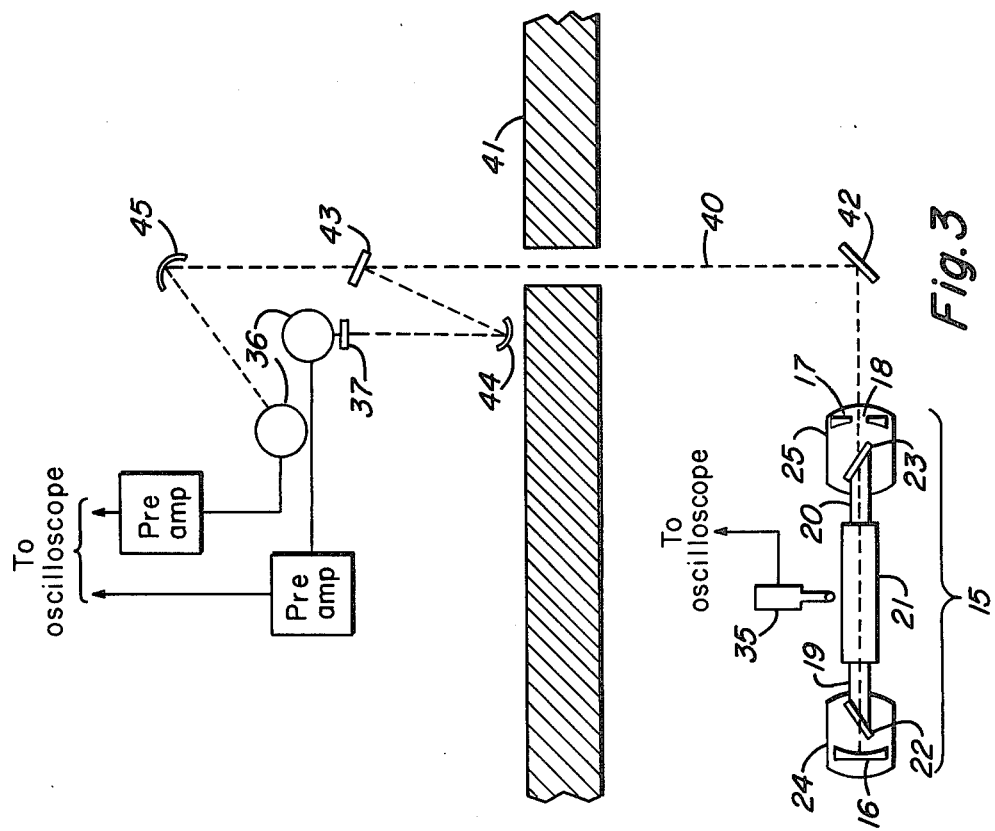
FIG. 3 is a schematic view of an embodiment of the laser of the invention.

An embodiment of the invention utilizing metal jets for the formation of MgF* as a lasing species together with appropriate diagnostic instrumentation for measuring laser output is shown schematically in FIGS. 3 and 4. Optical resonant cavity 15 is defined by gold-surfaced mirrors 16 and 17 of 10-m radii of curvature that are approximately 1 m apart. Mirror 17 has a 2-mm-diam hole 18 through its center for output coupling. The 25.4-mm inside diameter of brass tubes 19 and 20 defines the diameter of optical cavity 15. Tubes 19 and 20 are mounted to the ends of 304.8-mm-long Teflon box 21 and in turn have KBr windows 22 and 23, 75 mm × 37.5 mm × 6 mm, mounted at the Brewster angle at their opposite ends. O-rings provide the seal between tubes 19 and 20 and box 21, while gas inlet and vacuum lines are connected at compression fittings located on box 21. None of these are shown in FIGS. 3 and 4. Purge bags 24 and 25 result in cavity 15 being enclosed throughout its length and permit purging of cavity 15 with $N_2$ to prevent atmospheric attenuation of the laser wavelength.

FIG. 4 is a cross-sectional schematic end view of laser box 21 with grooved magnesium plate 26 and explosive assembly 38 attached. Grooved plate 26 forms one side of box 21 and is vacuum sealed thereto by means of O-rings 27 and 28. Dashed circle 29 represents the 25.4-mm-diam aperture of laser cavity 15. The distance from grooved plate 26 to the edge of optical cavity 15 is 7.9 mm. Plate 26 is 50.8 mm × 304.8 mm × 5.2 mm and has 16 uniformly spaced grooves 30 therein. Each groove 30 is 0.76 mm square, 267 mm long, and 0.76 mm from adjacent grooves. Centered on plate 26 and in contact therewith is a high explosive slab 31 of PBX 9404 weighing 0.45 kg. Four line wave generators 32 (only two are shown in FIG. 4) separated by acrylic spacer 33 produce plane wave initiation of explosive slab 31 with a simultaneity of 0.09 $\mu$sec. Plane wave generators 32 are detonated by means of detonators 34.

As shown in FIG. 3, an RCA 929 vacuum photodiode 35 fitted with a neutral density of 1.0 filter is positioned about 100 mm from the side of box 21 to provide a record of the visible fluorescence 90° from the laser axis. Infrared fluorescence and laser action is monitored on the laser axis with two HgCdTe photoconductive detectors 36 having peak responses at 16 $\mu$m. One of these detectors has an OCLI L-11140-9 long pass filter 37 that transmits only wavelengths greater than 11 $\mu$m. Tektronix 556 and 555 dual-beam oscilloscopes (not shown) are used to display the visible and infrared signals at several sensitivities and sweep speeds. The laser infrared signal 40 is reflected through firing chamber wall 41 by gold turning mirror 42. It is split into two beams by KRS-5 flat 43 which are in turn focused onto detectors 36 by focusing mirrors 44 and 45.

When grooved plate 26 and explosive assembly 38 are in place, the system is passivated by remote control from inside the firing chamber. Approximately 13 kPa of $F_2$ is introduced into the laser in stages, left for several minutes, and removed. Passivation products are swept out of the system with pulse purges of 1 to 3 kPa of $F_2$. The final $F_2$ fill is made just before the laser operation, and typically within 30 seconds of detonation of explosive assembly 38. Under these conditions and with 7.8 kPa of $F_2$ in box 21, infrared laser emission is readily produced when explosive assembly 38 is detonated. The pumping mechanism which produces the lasing species MgF* is chemical in nature and given by the reaction

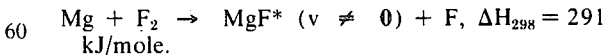

$Mg + F_2 \rightarrow MgF^* (v \neq 0) + F$, $\Delta H_{298} = 291$ kJ/mole.

Metals and oxidizers useful in the practice of this invention are not limited to those given by example in the embodiment just disclosed. The following metals are known, when rapidly atomized and mixed with gaseous fluorine, to produce molecular species having population inversions therein: Li, C, Mg, Al, Ti, V, Fe, Ni, Cu, Zn, Zr, Mo, Ag, Ta, W, Pt, Au, Pb, and U. Likewise titanium atoms are known to react with $NF_3$ to produce $TiF^*$. Uranium atoms will react with gaseous chlorine to produce an inverted molecular species. Finally, under the proper conditions, atoms of the refractory metals react with gaseous oxygen to produce molecular species having population inversions therein. Specifically, C, Ti, V, Zr, Mo, Ta, W, and U atoms are known to react with gaseous oxygen to produce inverted molecular species. A detailed discussion of metals and oxidizers which produce inverted molecular species is given in Los Alamos Scientific Laboratory Report LA-5452, "Metal Atom Oxidation Lasers," issued in March 1974. This report is available from the National Technical Information Service, U.S. Department of Commerce, 5285 Port Royal Road, Springfield, Virginia 22151.

What we claim is:

1. In a method of forming molecular species having a population inversion therein by atomizing a metal and mixing the atoms of said metal with a gaseous oxidizer, the improvement comprising forming said metal atoms by explosively shocking a grooved metal plate having a plurality of rectangular grooves therein to produce jets of metal vapor and directing said jets through said gaseous oxidizer.

2. The method of claim 1 wherein said oxidizer is fluorine.

3. The method of claim 2 wherein said metal is selected from the class consisting of Li, C, Mg, Al, Ti, V, Fe, Ni, Cu, Zn, Zr, Mo, Ag, Ta, W, Pt, Au, Pb, and U.

4. A chemical laser which comprises (a) an optical resonant cavity, (b) enclosure means for containing a gaseous oxidizer within said cavity, (c) a gaseous oxidizer contained within said cavity, (d) a grooved metal plate having a plurality of rectangular grooves therein adjacent to said cavity and in substantially parallel relationship thereto, and (e) means for explosively shocking said grooved metal plate to direct metal jets from said grooves in said plate through said oxidizer in said cavity to form molecules containing said metal and having a population inversion therein.

5. The laser of claim 4 wherein said grooved metal plate forms a wall of said enclosure means for containing a gaseous oxidizer within said cavity.

6. The laser of claim 5 wherein said grooved plate is exterior to said optical cavity and the plate standoff distance to cavity diameter ratio substantially equals the plate free surface to jet velocity ratio.

7. The laser of claim 4 wherein said oxidizer is $F_2$ and said metal is selected from the class consisting of Li, C, Mg, Al, Ti, V, Fe, Ni, Cu, Zn, Zr, Mo, Ag, Ta, W, Pt, Au, Pb, and U.

* * * * *